United States Patent Office 2,824,143
Patented Feb. 18, 1958

2,824,143

PRODUCTION OF LANOLIN ALCOHOLS

Waldo C. Ault and Abner Eisner, Glenside, and John T. Scanlan, Philadelphia, Pa., assignors to the United States of America as represented by the Secretary of Agriculture No Drawing. Application January 13, 1955
Serial No. 481,723

6 Claims. (Cl. 260—638)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to the conversion of lanolin to lanolin alcohols by sodium reduction and to the purification and recovery of the resulting alcohols. By "lanolin" we mean wool grease or wool wax, either crude or refined, as well as the various fractions thereof that contain significant amounts of esters. By "lanolin alcohols" we mean the mixture of the alcohols which comprise the natural alcohols present in wool wax (originally combined as esters for the most part) and the alcohols produced by the conversion of the combined acids to alcohols by sodium reduction. We use the term "lanolin alcohols" for this mixture of alcohols to distinguish it from the mixture of natural alcohols derived from lanolin by saponification and usually designated by the term "wool wax alcohols."

The lanolin alcohols are preferred to lanolin itself for many uses, especially in cosmetic and pharmaceutical compositions, because of their better appearance and consistency, more agreeable odor, better emulsifying properties, higher solubility in many solvents, greater affinity for water, and more ready absorption through skin and mucous membranes. Certain components, especially cholesterol and lanosterol, are also valuable intermediates in the synthesis of biologically active steroidal compounds.

Natural wool grease contains very small proportions of the free alcohols. Saponification of the natural grease yields a wool fat alcohol fraction amounting to only about 50% of the grease. Attempts have been made to increase the yield of alcohols by catalytically hydrogenating the grease, whereby the carboxylic acids present as esters are largely reduced to the corresponding alcohols. While this significantly increases the yield of alcohols, the process suffers from several serious handicaps: (1) Expensive special equipment is required for the requisite high-pressure hydrogenation; (2) expensive catalysts which are generally susceptible to easy poisoning are necessary; (3) substantially all of the olefinic unsaturation in the material is eliminated, and other drastic changes occur thus adversely affecting the properties of the product for many uses; and (4) the mixture obtained by such hydrogenation is extremely complex in composition and, because of its powerful emulsifying action, is very difficult to refine or recover in usable form.

An object of this invention is to provide refined lanolin alcohols in which substantially all the original olefinic unsaturation of the natural wool grease is retained. Another object is to provide processes for obtaining lanolin alcohols in high yield without resort to high pressure reactions. Still another object is to provide improved processes for the refining and recovery of lanolin alcohols.

According to the invention, lanolin is reduced to lanolin alcohols by treating lanolin with sodium and a reducing alcohol.

In a preferred procedure of reducing the lanolin to lanolin alcohols, the sodium is heated above its melting point in an inert organic solvent, such as toluene or xylene, and the lanolin and reducing alcohol, dissolved in another portion of the same solvent, are added, slowly and with efficient stirring, to the suspension of molten sodium. When the reaction is complete, the reaction mixture is slowly stirred, while hot, into a relatively small volume of hot water to hydrolyze the sodium alkoxides formed in the reaction.

The resulting emulsion containing aqueous alkali may be broken by addition of ethanol and the aqueous layer containing most of the alkali and ethanol separated from the remaining crude lanolin alcohol. The remaining reaction mixture is further purified by washing with an aqueous solution of a soluble barium salt and the lanolin alcohols are recovered from the washed reaction mixture.

In the process of reducing the lanolin esters to lanolin alcohols the free acids are not reduced to alcohols and are present in the alkaline reaction mixture as sodium soaps. In separation of the lanolin alcohols from the reaction mixture, the organic layer must be washed with water to remove residual free alkali. In this step the combined action of these soaps and the lanolin alcohols produces such stable emulsions that it is virtually impossible to separate the aqueous and organic layers.

The addition of a suitable quantity of a soluble barium salt to the wash water in this step not only removed the undesirable fatty acids from solution but it had the unexpected beneficial effect of so drastically reducing the emulsifying power of the lanolin alcohols that it is possible to wash the organic layer free of residual alkali without formation of troublesome emulsions.

After separating the organic layer, the lower alcohols, water and solvent are all removed by distillation, thus leaving only the barium salts and the lanolin alcohols. The latter are extracted from the mixture by use of a suitable volatile solvent, such as acetone or other lower aliphatic ketone, and recovered by evaporation of the solvent. The product thus obtained in high yield (about 80% of the weight of lanolin used) is much superior to lanolin alcohols obtained by other methods. It has a light color, very little odor, a smooth, buttery consistency, and low melting point. It retains substantially all the olefinic unsaturation of the original lanolin, has superior emulsifying properties and is much more soluble in the technically important solvents than is conventional lanolin alcohol. Thus, as much as 10% readily and completely dissolves in light petrolatum, a solvent base widely used in the formulation of cosmetic and pharmaceutical ointments, creams, lotions and salves.

The invention is further illustrated by the following examples:

*Example I.—Sodium reduction of U. S. P. lanolin.—* In a reaction flask equipped with an addition funnel, reflux condenser, stirrer and gas inlet tube, is placed 23.3 gms. of metallic sodium and 300 cc. of xylene. The air is flushed from the flask and inert atmosphere maintained throughout the reduction by feeding a constant stream of nitrogen to the system. The flask and its contents are heated to a point just short of reflux temperature and the molten sodium is dispersed in the solvent by rapid stirring. A mixture of 100 gms. of U. S. P. lanolin (ester No. 95.4, acid No. 1.2 and 1.22% OH), 100 gms. of xylene and 44.4 gms. of methylisobutyl carbinol was fed into the reaction flask at a rate sufficient to maintain good reflux due to the heat of reaction. After all the lanolin-reducing alcohol mixture was added (about 1 hour) an additional 15 cc. of methylisobutyl carbinol is added and the mixture refluxed with stirring for an additional hour.

The alkoxide mixture was hydrolyzed by adding the hot solution while stirring to 150 cc. of hot water. The hydrolysis step is also carried out in a nitrogen atmosphere. The rate of addition of the reduced mixture to the hydrolysis flask is rather rapid but not so fast as to exceed the capacity of the reflux condenser. Heating and stirring are continued for about ½ hour to insure complete hydrolysis. The reaction mixture, now in the form of an emulsion, is treated with enough ethanol to cause the emulsion to break. The organic layer is then washed while hot with 2 separate portions of hot barium chloride solution (5 gms. of $BaCl_2$ in 175 cc. of hot water). Washing is continued with hot water in 175 cc. portions until the pH of the washings is down to 8. The organic layer is then distilled to remove water, solvent and excess reducing alcohol. The residue consisting of product alcohols and barium soaps is well extracted with acetone. Evaporation of the acetone extract yields 79.7 gms. of reduced lanolin. The reduced lanolin had the following analysis: ester No. 3.9, acid No. 0.5, hydroxyl 4.93%, cholesterol 25.4%, lanosterol 19.9%.

*Example II.—Sodium reduction of technical lanolin.*—Employing the same technique as described in Example I, 200 gms. of technical lanolin (ester No. 84.9, acid No. 0.9, and 1.11% OH) were reduced using 38.6 gms. of sodium metal and 77.3 gms. of methylisobutyl carbinol. The yield of reduced lanolin was 160.3 gms. The analysis of the product was ester No. 6.2 and acid No. 0.5.

*Example III.—Sodium reduction of acid cracked wool grease.*—Water present in acid cracked grease is removed by azeotropic distillation before the reduction operation. A boiling flask equipped with a reflux condenser attached to a water trap was charged with 101 gms. of acid cracked wool grease (ester No. 78.2 and acid No. 28.2) and 125 cc. of xylene. The mixture was refluxed until no more water was caught in the trap (1 cc.). Additional solvent xylene was added to the flask so that the weight ratio of grease to solvent was 1:1. The proper amount of reducing alcohol (35.7 gms. of methylisobutyl carbinol) was then added to complete the feed mixture. The reaction flask was charged with 300 cc. of xylene and 19.9 gms. of metallic sodium. After carrying out the reduction operation and recovery as described in Example I, the yield of product was 65.0 gms. Analysis of the reduced wool grease (ester No. 11.7 and acid No. 0.5).

The amount of sodium required is theoretically one atom for each equivalent of free acid or free hydroxyl, in addition to four atoms for each equivalent of ester. The amount of reducing alcohol required is theoretically 2 mols of alcohol for each mol of ester. While methylisobutyl carbinol is the preferred reducing alcohol other lower aliphatic alcohols may be used. We prefer the secondary alcohols, such as sec.-butyl, methyl cyclohexanols, or the sec.-amyl alcohols, though the tertiary alcohols are also satisfactory. Primary alcohols react quite vigorously and side reactions occur and sodium is wasted.

Instead of the barium chloride used in the examples, other soluble barium salts may be used such as the nitrate or acetate. The amount is not critical and is easily determined by a preliminary experiment. Alternatively, a more concentrated solution of the salt may be added in portions to the aqueous emulsion of lanolin alcohols until the emulsion breaks.

The acetone used to extract the lanolin alcohols from the barium salts may be replaced with any suitable volatile solvent that will dissolve the lanolin alcohols without dissolving the barium salts. Some solvents, such as toluene or xylene, readily dissolve the lanolin alcohols but also dissolve and swell and disperse the barium soaps to such an extent that filtration is slow and actual gelation may occur. For this reason we prefer a solvent that has little affinity for the barium soaps. The lower aliphatic ketones are the preferred solvents, of which acetone is the most convenient and inexpensive to use.

Instead of the xylene used as the reaction medium in the above examples we may use any inert solvent that boils above the melting point of sodium and that is a solvent for lanolin and lanolin alcohols. The alkylated benzenes are the preferred solvents, for example, toluene, xylene, cumene, cymene, and ethylbenzene.

The barium salt treatment and subsequent steps in the recovery of the lanolin alcohols in the above examples may be used to advantage in the purification and recovery of lanolin alcohols made by procedures other than sodium reduction. Thus the crude lanolin alcohols obtained by the saponification or the catalytic hydrogenolysis of lanolin may be thus purified and recovered. The barium salt treatment is also helpful in the alkali washing of lanolin itself.

We claim:

1. The process of producing lanolin alcohols which comprises treating lanolin with sodium and a reducing alcohol in an inert organic solvent to produce a reaction mixture comprising the alkoxides of the lanolin alcohols and the sodium salts of acids present in the original lanolin, hydrolyzing said reaction mixture to produce a hydrolysis mixture comprising lanolin alcohols and said sodium salts of acids present in the orginial lanolin, separating the lanolin alcohols and sodium salts from said hydrolysis mixture, washing the separated mixture of lanolin alcohols and sodium salts with an aqueous solution of a barium salt to produce a mixture comprising lanolin alcohols and barium salts of acids present in the original lanolin, and recovering lanolin alcohols from the washed mixture.

2. The process of claim 1 wherein the lanolin alcohols are recovered from the washed mixture by evaporating substantially all of the water and volatile organic material from said washed mixture, extracting the lanolin alcohols with a volatile organic solvent which is a solvent for the lanolin alcohols but not for the barium salts, and recovering the lanolin alcohols from the extract.

3. The process of producing lanolin alcohols which comprises reducing lanolin with sodium and a lower secondary aliphatic alcohol in an inert organic solvent to produce a reaction mixture comprising the alkoxides of the lanolin alcohols and the sodium salts of acids present in the original lanolin, hydrolyzing said reaction mixture to produce a hydrolysis mixture comprising lanolin alcohols and said sodium salts of acids present in the original lanolin, separating the lanolin alcohols and sodium salts from said hydrolysis mixture, washing the separated mixture of lanolin alcohols and sodium salts with an aqueous solution of a barium salt to produce a mixture comprising lanolin alcohols and barium salts of acids present in the original lanolin, evaporating substantially all of the water and volatile organic material from said washed mixture, extracting the lanolin alcohols from the evaporation residue with a lower aliphatic ketone, and evaporating the ketone to obtain said lanolin alcohols.

4. The process of claim 3 wherein the lanolin alcohols and sodium salts are separated from the hydrolysis mixture by adding ethanol to said hydrolysis mixture to produce an aqueous layer and an organic layer containing the lanolin alcohols and sodium salts, and separating said organic layer from the aqueous layer.

5. The process of claim 4 wherein the lower secondary aliphatic alcohol is methylisobutyl carbinol, the inert organic solvent is xylene, and the ketone is acetone.

6. A process of recovering lanolin alcohols from mixtures comprising said lanolin alcohols and alkali metal salts of acids present in lanolin, which comprises washing said mixtures with an aqueous solution of a barium salt, evaporating substantially all water and any volatile organic material present in said washed mixture, and extracting the lanolin alcohols from the evaporation residue by means of a volatile organic solvent which is not a solvent for barium salts of acids present in lanolin.

(Other references on following page)

References Cited in the file of this patent

UNITED STATES PATENTS

| | | |
|---|---|---|
| 991,874 | Morgenstern | May 9, 1911 |
| 2,019,022 | Scott et al. | Oct. 29, 1935 |
| 2,365,915 | Taylor | Dec. 26, 1944 |
| 2,647,932 | Blinka et al. | Aug. 4, 1935 |
| 2,719,858 | Hill | Oct. 4, 1955 |

OTHER REFERENCES

Martin et al.: Transactions of the Faraday Society, vol. 37 (1941), Gurnez and Jackson, London; pp. 30–8.

Colbert: Shorter Course in Organic Chemistry (2nd edit., 1942), Appleton-Century, N. Y., page 150.

Hansley: Ind. Eng. Chem., vol. 39 (1947), pages 55–62.

Kastens: Ind. Eng. Chem., vol. 41 (1949), pp. 438–46.

Lucas et al.: Principles and Practice in Organic Chemistry, Wiley & Sons, Inc., N. Y., 1950; page 79.

Craig et al.: Technique of Organic Chemistry, III, Interscience Publ., Inc., N. Y., 1950; pp. 301–2.